(12) United States Patent
Redford

(10) Patent No.: US 6,732,253 B1
(45) Date of Patent: May 4, 2004

(54) LOOP HANDLING FOR SINGLE INSTRUCTION MULTIPLE DATAPATH PROCESSOR ARCHITECTURES

(75) Inventor: John Redford, Cambridge, MA (US)

(73) Assignee: ChipWrights Design, Inc., Newton, MA (US)

( * ) Notice: Subject to any disclaimer, the term of this patent is extended or adjusted under 35 U.S.C. 154(b) by 0 days.

(21) Appl. No.: 09/711,556

(22) Filed: Nov. 13, 2000

(51) Int. Cl.$^7$ .............................................. G06F 15/80
(52) U.S. Cl. ........................ 712/22; 712/15; 712/226; 712/241
(58) Field of Search .......................... 712/22, 226, 241, 712/15

(56) References Cited

U.S. PATENT DOCUMENTS

| | | | |
|---|---|---|---|
| 4,101,960 A | 7/1978 | Stokes et al. | 712/22 |
| 4,138,720 A | 2/1979 | Chu et al. | 711/211 |
| 4,181,942 A | 1/1980 | Forster et al. | 712/241 |
| 4,410,939 A | 10/1983 | Kawakami | 710/264 |
| 4,434,461 A | 2/1984 | Puhl | 710/260 |

(List continued on next page.)

FOREIGN PATENT DOCUMENTS

| | | |
|---|---|---|
| EP | 0 314 277 | 5/1989 |
| EP | 0 552 816 | 7/1993 |
| EP | 0 679 991 | 11/1995 |
| EP | 0 945 783 | 9/1999 |
| EP | 0 681 236 | 11/2000 |
| GB | 2 201 015 | 8/1988 |
| GB | 2201015 A * | 8/1988 |
| JP | 10/289305 | 10/1998 |
| JP | 2002-7359 | 1/2002 |
| WO | WO 87/00318 | 1/1987 |
| WO | WO 91/19269 | 12/1991 |
| WO | WO 93/04438 | 3/1993 |
| WO | WO 99/14685 | 3/1999 |

OTHER PUBLICATIONS

Banerjee et al., "Fast execution of loops with IF statements", IEEE vol. 84, pp 126–132 (1984).
"Single–Bit Processor Enable Scheme", IBM Technical Disclosure Bulletin, vol. 29, No. 11 (Apr. 1987).
Hennessey et al., "Enhancing Vector Performance", Computer Architecture, a Qualitative Approach, Second Edition, Section 5, pp B23–B29 (1996).
Levinthal et al., "Chap—A SIMD Graphics Processor" Computer Graphics, vol. 18, No. 3 (Jul. 1984).
Abstract search, pp 1–329, dated Mar. 21, 2003.
Abstract search, pp 1–7, dated Mar. 21, 2003.
Abstract search, pp 1–82, dated Mar. 21, 2003.
John L. Hennessey et al., "Enhancing Vector Performance," Computer Architecture a Quantitative Approach, Second Edition, Section B5, pp. B23–B29, 1996.

Primary Examiner—Kenneth S. Kim
(74) Attorney, Agent, or Firm—Fish & Richardson P.C.

(57) ABSTRACT

A method of controlling the enabling of processor datapaths in a SIMD processor during a loop processing operation is described. The information used by the method includes an allocation between the data items and a memory, a size of the array, and a number of remaining parallel passes of the datapaths in the loop processing operation. A computer instruction is also provided, which includes a loop handling instruction that specifies the enabling of one of a plurality of processor datapaths during processing an array of data items. The instruction includes a count field that specifies the number of remaining parallel loop passes to process the array and a count field that specifies the number of serial loop passes to process the array. Different instructions can be used to handle different allocations of passes to parallel datapaths. The instruction also uses information about the total number of datapaths.

11 Claims, 3 Drawing Sheets

U.S. PATENT DOCUMENTS

| | | | |
|---|---|---|---|
| 4,435,758 A | 3/1984 | Lorie et al. | 712/22 |
| 4,592,013 A | 5/1986 | Prame | 711/219 |
| 4,604,695 A | 8/1986 | Widen et al. | 711/217 |
| 4,679,140 A | 7/1987 | Gotou et al. | 712/229 |
| 4,773,038 A | 9/1988 | Hillis et al. | 703/20 |
| 4,992,933 A * | 2/1991 | Taylor | 712/209 |
| 5,021,993 A | 6/1991 | Matoba et al. | 712/228 |
| 5,038,282 A | 8/1991 | Gilbert et al. | 712/14 |
| 5,045,995 A * | 9/1991 | Levinthal et al. | 712/236 |
| 5,111,389 A | 5/1992 | McAuliffe et al. | 711/203 |
| 5,121,498 A | 6/1992 | Gilbert et al. | 717/149 |
| 5,136,697 A | 8/1992 | Johnson | 712/239 |
| 5,224,214 A | 6/1993 | Rosich | 710/39 |
| 5,230,079 A | 7/1993 | Grondalski | 712/18 |
| 5,276,895 A | 1/1994 | Grondalski | 712/11 |
| 5,361,367 A | 11/1994 | Fijany et al. | 712/15 |
| 5,430,854 A * | 7/1995 | Sprague et al. | 712/236 |
| 5,479,624 A | 12/1995 | Lee | 711/1 |
| 5,497,478 A | 3/1996 | Murata | 711/157 |
| 5,524,223 A | 6/1996 | Lazaravich et al. | 712/241 |
| 5,542,074 A | 7/1996 | Kim et al. | 712/22 |
| 5,551,039 A * | 8/1996 | Weinberg et al. | 712/10 |
| 5,555,386 A | 9/1996 | Nomura | 712/201 |
| 5,555,428 A * | 9/1996 | Radigan et al. | 712/22 |
| 5,590,283 A | 12/1996 | Hillis et al. | 712/29 |
| 5,590,356 A | 12/1996 | Gilbert | 712/31 |
| 5,604,913 A | 2/1997 | Koyanagi et al. | 712/5 |
| 5,608,886 A | 3/1997 | Blomgren et al. | 712/239 |
| 5,638,533 A | 6/1997 | Law | 711/157 |
| 5,659,722 A | 8/1997 | Blaner et al. | 712/234 |
| 5,659,778 A * | 8/1997 | Gingold et al. | 712/11 |
| 5,666,519 A | 9/1997 | Hayden | 703/23 |
| 5,684,973 A | 11/1997 | Sullivan et al. | 711/5 |
| 5,696,958 A | 12/1997 | Mowry et al. | 712/235 |
| 5,737,572 A | 4/1998 | Nunziata | 711/157 |
| 5,752,068 A | 5/1998 | Gilbert | 712/16 |
| 5,758,112 A | 5/1998 | Yeager et al. | 712/217 |
| 5,758,176 A | 5/1998 | Agarwal et al. | 712/23 |
| 5,778,241 A | 7/1998 | Bindloss et al. | 712/20 |
| 5,805,915 A | 9/1998 | Wilkerson et al. | 712/20 |
| 5,822,606 A | 10/1998 | Morton | 712/16 |
| 5,848,290 A | 12/1998 | Yoshida et al. | 712/26 |
| 5,870,581 A | 2/1999 | Redford | 712/218 |
| 5,872,987 A | 2/1999 | Wade et al. | 712/3 |
| 5,924,117 A | 7/1999 | Luick | 711/127 |
| 5,933,650 A | 8/1999 | van Hook et al. | 712/2 |
| 5,946,222 A | 8/1999 | Redford | 708/490 |
| 5,991,857 A | 11/1999 | Koetje et al. | 711/157 |
| 6,049,330 A | 4/2000 | Redford | 345/543 |
| 6,052,703 A | 4/2000 | Redford | 708/402 |
| 6,067,609 A | 5/2000 | Mecker et al. | 712/11 |
| 6,076,158 A | 6/2000 | Sites et al. | 712/230 |
| 6,121,905 A | 9/2000 | Redford | 341/67 |
| 6,130,631 A | 10/2000 | Redford | 341/67 |
| 6,175,892 B1 | 1/2001 | Sazzard et al. | 711/100 |
| 6,211,864 B1 | 4/2001 | Redford | 345/543 |
| 6,216,223 B1 | 4/2001 | Revilla et al. | 712/245 |
| 6,282,623 B1 | 8/2001 | Halahmi et al. | 711/201 |
| 6,282,628 B1 | 8/2001 | Dubey et al. | 712/22 |
| 6,292,879 B1 | 9/2001 | Fong | 711/214 |
| 6,381,668 B1 | 4/2002 | Lunteren | 711/5 |
| 6,404,439 B1 | 6/2002 | Coulombe et al. | 345/505 |
| 6,452,864 B1 | 9/2002 | Condemi et al. | 365/233 |
| 6,473,339 B2 | 10/2002 | De Ambroggi et al. | 365/185.09 |
| 6,487,651 B1 | 11/2002 | Jackson et al. | 712/13 |

\* cited by examiner

30 DATA ITEMS IN AN ARRAY
4 DATA PATHS (NDP = 4)

| LOOP PASS | DP0 | DP1 | DP2 | DP3 | C | L |
|---|---|---|---|---|---|---|
| 1 | 0 | 1 | 2 | 3 | 7 | 30 |
| 2 | 4 | 5 | 6 | 7 | 6 | 30 |
| 3 | 8 | 9 | 10 | 11 | 5 | 30 |
| 4 | 12 | 13 | 14 | 15 | 4 | 30 |
| 5 | 16 | 17 | 18 | 19 | 3 | 30 |
| 6 | 20 | 21 | 22 | 23 | 2 | 30 |
| 7 | 24 | 25 | 26 | 27 | 1 | 30 |
| 8 | 28 | 29 | x | x | 0 | 30 |

(UNITY STRIDE)

FIG. 2

$$PE[i,j] = LOOP\_PE\_x \underset{\underline{30}}{(C, L)}$$

FIG. 3

30 DATA ITEMS IN AN ARRAY
4 DATA PATHS (NDP = 4)

| LOOP PASS | DP0 | DP1 | DP2 | DP3 |
|---|---|---|---|---|
| 1 | 0 | 8 | 16 | 24 |
| 2 | 1 | 9 | 17 | 25 |
| 3 | 2 | 10 | 18 | 26 |
| 4 | 3 | 11 | 19 | 27 |
| 5 | 4 | 12 | 20 | 28 |
| 6 | 5 | 13 | 21 | 29 |
| 7 | 6 | 14 | 22 | x |
| 8 | 7 | 15 | 23 | x |

(CONTIGUOUS STRIDE)

FIG. 4 if (PE [i, j] = LOOP_PE_x (C--, L)) go to PC + Destination
                                              └──── 70 ────┘

FIG. 5

LOOP HANDLING FOR SINGLE INSTRUCTION MULTIPLE DATAPATH PROCESSOR ARCHITECTURES

TECHNICAL FIELD

This invention relates to loop handling operations over an array of data items in a single instruction multiple datapath (SIMD) processor architecture.

BACKGROUND

Parallel processing is an efficient way of processing an array of data items. A SIMD processor is a parallel processor array architecture wherein multiple datapaths are controlled by a single instruction. Each datapath handles one data item at a given time. In a simple example, in a SIMD processor having four datapaths, the data items in an eight data item array would be processed in each of the four datapaths in two passes of a loop operation. The allocation between datapaths and data items may vary, but in one approach, in a first pass the first data item in the array is processed by a first datapath, a second data item in the array is processed by a second datapath, a third data item is processed by a third datapath, and a fourth data item is processed by a fourth datapath. In a second pass, a fifth data item is processed by the first datapath, a sixth data item is processed by the second datapath, a seventh data item is processed by the third datapath, and an eighth data item is processed by the fourth datapath.

Problems may occur when the number of data items in the array is not an integer multiple of the number of datapaths. For example, modifying the simple example above so that there are four datapaths and an array having seven data items, during the second pass, the fourth datapath does not have an element in the eighth item of the array to process. As a result, the fourth datapath may erroneously write over some other data structure in memory, unless the fourth datapath is disabled during the second pass.

One way of avoiding such erroneous overwriting is to force the size of the array, i.e., the number of data items contained within the array, to be an integer multiple of the number of datapaths. Such an approach assumes that programmers have a priori control of how data items are allocated in the array, which they may not always have.

Typically, each datapath in a SIMD processor has an associated processor enable bit that controls whether a datapath is enabled or disabled. This allows a datapath to be disabled when, e.g., the datapath would otherwise overrun the array.

SUMMARY

In a general aspect, the invention features a method of controlling whether to enable one of a plurality of processor datapaths in a SIMD processor that are operating on data elements in an array, including determining whether to enable the datapath based on information about parameters of the SIMD processor and the array, and a processing state of the datapaths relative to the data items in the array.

In a preferred embodiment, the information includes an allocation between the data items and a memory, a total number of parallel loop passes in a loop processing operation being performed by the datapaths, a size of the array, and a number of datapaths (i.e., how many datapaths there are in the SIMD processor). The processing state is a number of remaining parallel passes of the datapaths in the loop processing operation.

The allocation between the data items and the memory may be unity-stride, contiguous or striped-stride.

In another aspect, the invention features a computer instruction including a loop handling instruction that specifies the enabling of one of a plurality of processor datapaths during processing an array of data items.

In a preferred embodiment, the instruction includes a parallel count field that specifies the number of remaining parallel loop passes to process the array, and a serial count field that specifies the number of serial loop passes to process the array.

In another aspect, the invention features a processor including a register file and an arithmetic logic unit coupled to the register file, and a program control store that stores a loop handling instruction that causes the processor to enable one of a plurality of processor datapaths during processing of an array of data.

Embodiments of various aspects of the invention may have one or more of the following advantages.

Datapaths may be disabled without having prior knowledge of the number of data items in the array.

The method is readily extensible to a variety of memory allocation schemes.

The loop handling instruction saves instruction memory because the many operations needed to determine whether to enable or disable a datapath may be specified with a simple and powerful single instruction that also saves register space.

The loop handling instruction saves a programmer from having to force the number of data items in the array of data items to be an integer multiple of the number of datapaths.

Other features and advantages of the invention will be apparent from the following detailed description and drawings, and from the claims.

DESCRIPTION OF DRAWINGS

FIG. 2 shows a table of how thirty data items in an array are handled by a SIMD processor having four datapaths during loop processing in a unity stride allocation of memory.

FIG. 3 shows the syntax of a loop handling instruction.

FIG. 4 shows a table of how thirty data items in an array are handled by a SIMD processor having four datapaths during loop processing in a contiguous stride allocation of memory.

FIG. 5 shows the syntax of a loop handling instruction combined with a loop branch.

Like reference symbols in the various drawings indicate like elements.

DETAILED DESCRIPTION

Figure 1:
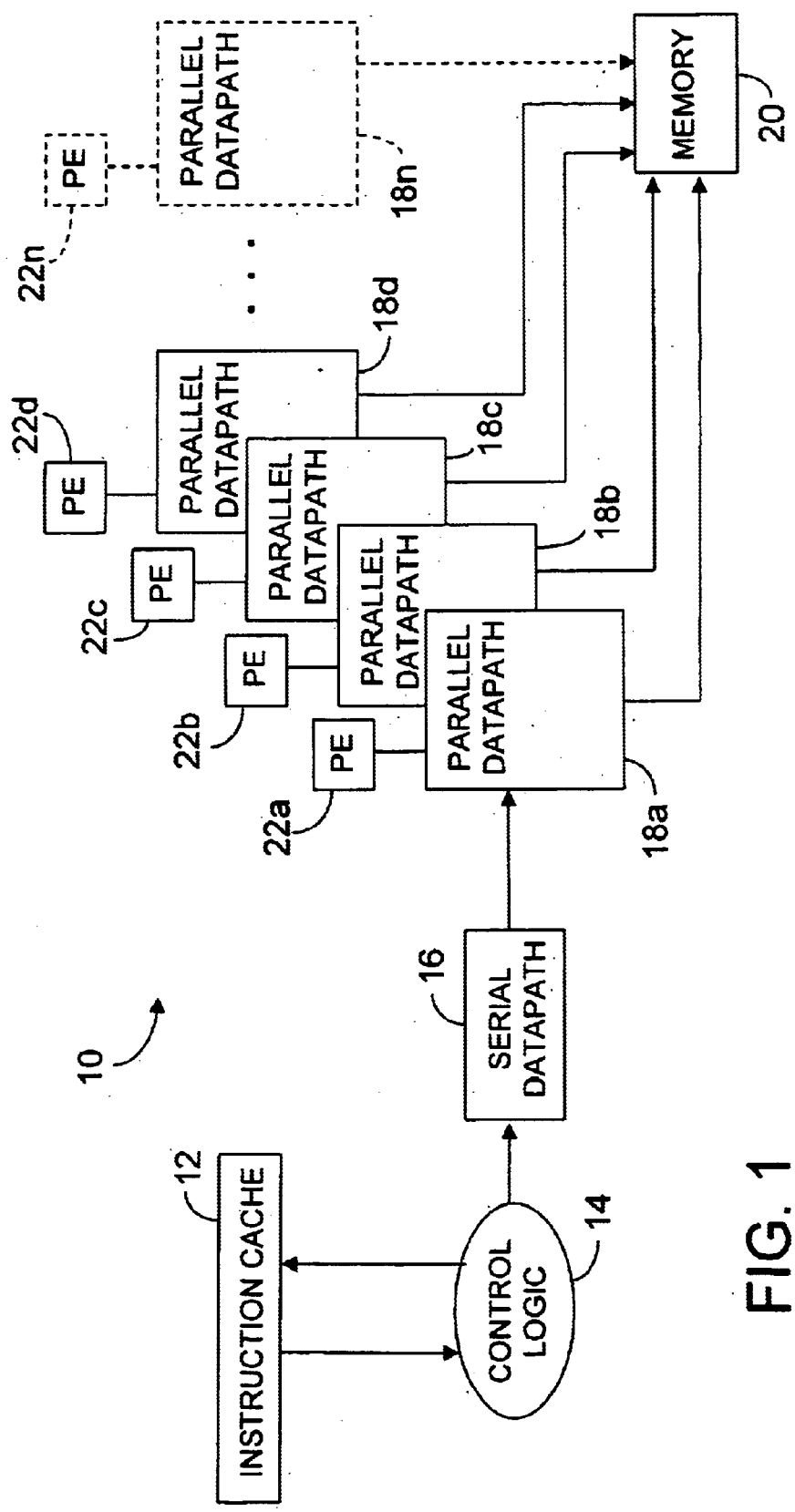
FIG. 1 is a block diagram of a single instruction multiple datapath (SIMD) processor.

Referring to FIG. 1, a single instruction multiple datapath (SIMD) processor 10 includes an instruction cache 12, control logic 14, a serial datapath, and a number of parallel datapaths labeled 18a, 18b, 18c, 18, . . . 18n. The parallel datapaths 18 write to a memory 20. Each of the datapaths 18 has an associated processor enable (PE) bit 22. Specifically, parallel datapath 18a is associated with a PE bit 22a, parallel datapath 18b is associated with a PE bit 22b, and so forth. When a PE bit is enabled, its associated parallel datapath is enabled and data items may be written by that parallel datapath. For example, if PE bit 22a is enabled, data items may be written by parallel datapath 18a; if PE bit 22b is enabled, data items may be written by parallel datapath 18b. If PE bit 22n is enabled, data items may be written by parallel datapath 18n. When a PE bit is disabled, its associated parallel datapath is disabled and data items may not be written by that parallel datapath.

In operation, the control logic 14 fetches an instruction from the instruction cache 12. The instruction is fed to the serial datapath 16 that provides the instruction to the datapaths 18. Each of the datapaths 18 are read together and written together unless the processor enable bit is disabled for a particular datapath.

One or more of the datapaths 18 may need to be disabled during a loop processing operation of an array of data items to avoid an unused datapath from overrunning the end of the array and erroneously writing over another data structure in memory. Rather than manually having to determine when during the loop processing operation to enable and disable datapaths, this determination may be made on the fly during the loop processing operation, based on information about parameters of the SIMD processor and the array, and the processing state of the datapaths relative to the data items in the array. This information includes: (1) the total number of parallel loop passes occurring in the loop processing operation, (2) the number of loop passes that would execute in a serial datapath design (which indicates the size of the array), (3) the number of remaining parallel passes occurring in the loop processing operation, (4) the memory allocation used to allocate data items of the array among the datapaths, and (5) the number of parallel datapaths. Instructions that enable or disable a processor enable bit for a datapath (thereby enabling or disabling the datapath) during loop processing based on this information are provided.

There are many ways to allocate memory for processing of an array of data items in a SIMD processor. The simplest memory allocation is where each one of a number of datapaths (NDP) takes the NDPth iteration of the loop. This type of memory allocation is called "unity stride."

Referring to FIG. 2, for example, a table illustrating how thirty data items numbered 0 to 29 in an array are handled by a SIMD processor having four datapaths labeled DP0, DP1, DP2 and DP3, respectively, during loop processing in a unity stride memory allocation is shown. In order to process the array, eight parallel loop passes are executed. In a parallel loop pass 1, data items 0, 1, 2, and 3 are handled by datapaths 0, 1, 2, and 3. In a parallel loop pass 2, data items 4, 5, 6 and 7 are handled by datapaths 0, 1, 2, and 3. In a final parallel loop pass, parallel loop pass 8, data items 28 and 30 and handled by datapaths 0 and 1 while datapaths 2 and 3 must be disabled to avoid overrunning the array and writing over other data stored in memory.

The table in FIG. 2 illustrates why this type of memory allocation is referred to as unity-stride. The "stride" between data items being processed in each of the parallel datapaths in any given parallel loop pass is one. That is, the difference between any two data items being processed by parallel datapaths in a parallel loop pass is one (or unity).

In the unity stride allocation, as the number of data items are being processed a pattern emerges. Specifically, the pattern illustrates that only two datapaths in a final parallel loop pass need to be disabled. (Obviously, the pattern illustrated in FIG. 2 is trivial; as the number of datapaths and the array size are increased, the pattern becomes more complex, but is discernible in time.) From a knowledge of the pattern, the total number of loop passes that would execute in a serial machine (which indicates the size of the array), the number of remaining parallel loop passes, and the number of datapaths, an instruction is provided to determine whether a particular datapath should be disabled during a particular parallel loop pass.

Referring to FIG. 3, a loop processor enable instruction 30 includes a field C representing the number of remaining parallel loop passes during a loop processing operation, and a field L representing the overall number of passes needed to service all the data items in an array in a serial machine architecture. The instruction 30 includes a memory allocation designation x. In the example described with reference to FIG. 2, the memory allocation designation x would refer to a unity-stride memory allocation, i.e., U, and L=30 since there are thirty data items that would require thirty loop passes in a serial machine architecture. PE[i, j] represents the state of the processor enable bit for datapath i during parallel loop pass j.

For the unity-stride example described in reference to FIG. 2, the total number of parallel loop passes is determined by dividing the total number of serial loop passes by the number of datapaths, and rounding the result up to the next integer. Thus, in the example the total number of parallel loop passes equals 30/4, which rounded up to the next integer produces 8.

Using the knowledge gained from the pattern present in the unity-stride example and the values of C and L, a processor enable bit associated with a datapath index i representing the datapath and a data item j, that is, PE [i, j], is enabled if the total number of parallel loop passes minus the number of remaining parallel loop passes, all multiplied by the total number of datapaths plus the datapath index, is less than the total number of serial loop passes.

Alternatively, SIMD processor 10 may use a contiguous stride memory allocation. Referring to FIG. 4, a table illustrating how thirty data items (0 to 29) in an array are handled by SIMD processor 10 having four datapaths (DP0–DP3) and implementing a contiguous stride memory allocation is shown. In order to process all thirty data items in the array, eight parallel passes are executed. In a parallel loop pass 1, data items 0, 8, 16 and 24 are handled by datapaths 0, 1, 2 and 3, respectively. In parallel loop pass 2, data items 1, 9, 17 and 25 are handled by datapaths 0, 1, 2 and 3. As processing continues, a pattern arises. In this specific example, in parallel loop passes 7 and 8, datapath 3 needs to be disabled to avoid writing over memory beyond the end of the thirty data items in the array. All other datapaths are enabled in every pass.

The contiguous-stride memory allocation is useful when neighboring data items are used when working on a particular data item. For example, if datapath 0 is processing data item 4 in parallel loop pass 5, it already has data item 3 from parallel loop pass 4 and will be using data item 5 on the next parallel loop pass. This memory allocation is called contiguous stride allocation because each datapath is accessing a contiguous region of the array.

In the contiguous stride memory allocation, a pattern emerges to suggest that a single datapath needs to be disabled during executions of, in this example, the last two parallel loop passes. Referring again to FIG. 3, a memory allocation designation x=CONT represents a contiguous-stride memory allocation scheme. For the example described with reference to FIG. 4, the total number of parallel loop passes needed to process the array of data items is determined by dividing the total number of serial loop passes by the number of datapaths and rounding the result up to the next integer. Thus, in the example, the total number of parallel loop passes equals 30/4, rounded up to 8.

From the contiguous-stride memory allocation pattern and the values of C and L, a processor enable bit associated with a datapath index i and a data item j, that is, PE [i, j], is enabled if the total number of parallel loop passes multiplied by the datapath index plus the total number of parallel loop passes minus the number of remaining parallel loop passes is less than the total number of serial loop passes.

An interleaved memory system permits many memory accesses to be done at once. The number of memory banks M in an interleaved memory system is generally a power of two, since that allows the memory bank selection to be made using the lowest address bits. If the stride in a read or write instruction is also a power of two, the memory interleaving will not help, since all the addresses will try to access the same memory bank. For example, if M=4 and the stride is also four, the addresses for the read or write would be 0, 4, 8, and so forth, and they would all have to be handled by bank 0; banks 1, 2 and 3 would be idle.

To avoid having all of the data items processed in the same memory bank, the stride value may be selected to be an odd number. Selecting the stride to be an odd number spreads the addresses evenly among M banks if M is a power of two, since any odd number and any power of two are mutually prime. In the case of a 30 element array, the stride would be 9, not 8 as with the contiguous allocation. Datapath 0 would correspond to array elements 0 to 8, datapath 1 would be associated with array elements 9 to 17, and datapath 2 would correspond to elements 18 to 26, and datapath 3 would be assigned to elements 26 to 29. Datapath 3 would be turned off for the last six elements, i.e., array elements 30 to 35. This memory allocation is referred to as a striped-stride memory allocation.

The number of parallel loop passes needed to process an array of data items in a striped-stride memory allocation scheme is determined by dividing the total number of serial datapaths by the number of datapaths and rounding the result up to the next odd integer.

Referring again to FIG. 3, a memory designation x=S represents striped-stride allocation. A processor enable bit associated with a datapath i and a data item j, that is, PE [i, j], is enabled if the total number of parallel loop passes times the datapath index plus the total number of parallel loop passes minus the number of remaining parallel loop passes is less than the total number of serial loop passes.

Referring to FIG. 5, the loop processor enable instruction is shown combined with a loop branch instruction 70. This combined instruction 70 will set the processor enable bit, as described previously, according to the memory allocation scheme, the overall number of parallel loop passes and the number of remaining parallel loop passes, and test if the number of remaining parallel loop passes equals zero. If the number of remaining passes greater than zero, the branch is performed (i.e., "go to PC+displacement"), to perform the next pass of the loop operation. Otherwise, the loop is exited, and processing continues. In either case, the number of remaining parallel loop passes is decremented and the loop processing operation continues.

Figure 6:
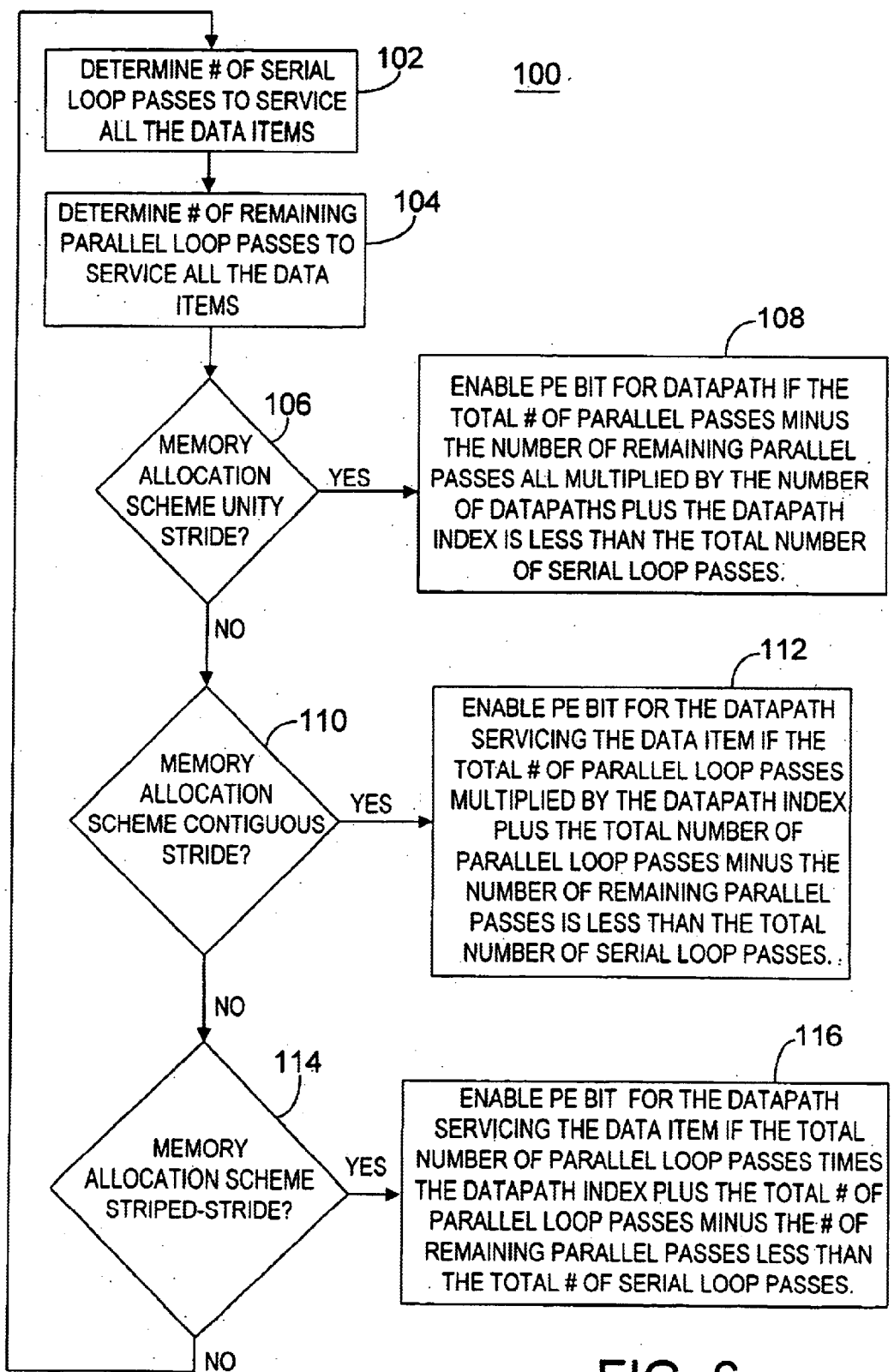
FIG. 6 is a flow diagram of a process of controlling the enabling of datapaths in a SIMD processor during loop processing.

Referring to FIG. 6, a process 100 of controlling the enabling of a datapath in a SIMD processor during loop processing determines 102 the number of serial loop passes to service all of the data items in an array. The process determines 104 the number of remaining parallel loop passes to service the array. The process then tests 106 whether the memory allocation scheme is a unity stride allocation. If the memory allocation is a unity stride allocation, the processor enable bit for the datapath servicing the data item is enabled 108 if the total number of parallel loop passes minus the number of remaining parallel loop passes, all multiplied by the total number of datapaths plus the datapath index, is less than the total number of serial loop passes.

If the memory allocated is not unity stride, the process tests 110 whether the memory allocation scheme is a contiguous stride allocation. If the memory allocation is a contiguous stride allocation, the processor enable bit for the datapath servicing the data item is enabled 112 if the total number of parallel loop passes multiplied by the datapath index plus the total number of parallel loop passes minus the number of remaining parallel loop passes is less than the total number of serial loop passes.

Finally, if the memory allocation is neither unity stride nor contiguous, the process tests 114 whether the memory allocation scheme is a striped stride allocation. If the memory allocation is a striped stride allocation, the processor enable bit for the datapath servicing the data item is enabled 116 if the total number of parallel loop passes times the datapath index plus the total number of parallel loop passes minus the number of remaining parallel loop passes is less than the total number of serial loop passes.

A number of embodiments of the invention have been described. Nevertheless, it will be understood that various modifications may be made without departing from the spirit and scope of the invention. For example, for processing larger numbers of data items, a lookup table could be utilized until a time at which a pattern develops according to the memory allocation scheme employed. Once the pattern develops, the enabling of datapaths is determined by the method herein described. Accordingly, other embodiments are within the scope of the following claims.

What is claimed is:

1. A method of controlling whether to enable a datapath included in a plurality of processor datapaths that can process data elements in an array, the plurality of processor datapaths comprising part of an SIMD processor, the method comprising:

determining whether to enable the datapath to process one of said data elements based on information about parameters of the SIMD processor and the array;

wherein the information comprises an allocation between the data elements and a memory, a total number of parallel loop passes needed to process the data elements in a loop processing operation performed by the plurality of processor datapaths, a size of the array, a remaining number of parallel loop passes needed to process the data elements in the loop processing operation, and a number of processor datapaths.

2. The method of claim 1, wherein the allocation between the data elements and the memory is unity-stride.

3. The method of claim 2, wherein the total number of parallel loop passes is determined by dividing a total number of serial loop passes needed to process the data elements in the array by the number of processor datapaths and rounding a resulting dividend up to a next integer.

4. The method of claim 3, wherein determining comprises:

calculating the total number of parallel loop passes minus the number of remaining parallel loop passes to obtain a resulting difference;

multiplying the resulting difference by a sum of the number of processor datapaths and a datapath number to obtain a resulting product; and determining if the resulting product is less than the total number of serial loop passes.

5. The method of claim 1, wherein the allocation between the data elements and the memory is contiguous stride.

6. The method of claim 5, wherein the total number of parallel loop passes is determined by dividing a total number of serial loop passes needed to process the data elements in the array by the number of datapaths and rounding a resulting dividend up to a next integer.

7. The method of claim 6, wherein determining comprises:

determining whether the total number of parallel loop passes multiplied by a datapath number plus the total number of parallel loop passes minus the number of remaining parallel loop passes is less than the total number of serial loop passes.

8. The method of claim 1, wherein the allocation is striped stride.

9. The method of claim 8, wherein determining comprises:

determining whether the total number of parallel loop passes times a datapath number plus the total number of parallel loop passes minus the number of remaining parallel loop passes is less than a total number of serial loop passes needed to process the data elements in the array.

10. A computer readable medium that stores a computer instruction, the computer instruction comprising:

a loop handling instruction that specifies selective enabling of one of a plurality of processor datapaths during processing of an array of data elements in a pass of a loop processing operation performed by the processor datapaths, the selective enabling being based on whether a condition in said computer instruction is met; and a parallel count field that specifies a number of remaining parallel loop passes needed to process the array in the loop processing operation.

11. The computer readable medium of claim 10, wherein the computer instruction further comprises:

a serial count field that specifies a number of serial loop passes needed to process the array via at least some of the processor datapaths.

* * * * *

UNITED STATES PATENT AND TRADEMARK OFFICE
CERTIFICATE OF CORRECTION

PATENT NO. : 6,732,253 B1  Page 1 of 1
APPLICATION NO. : 09/711556
DATED : May 4, 2004
INVENTOR(S) : John Redford It is certified that error appears in the above-identified patent and that said Letters Patent is hereby corrected as shown below:

On the title page, and col. 1, line 1-3, please delete "Loop Handling for Single Instruction Multiple Datapath Processor Architectures" and insert --Selective Enabling of Datapaths in SIMD Processor for Processing Non-Integral Multiple Array Data in Plural Loops--.

Signed and Sealed this

Eighth Day of January, 2008

JON W. DUDAS
*Director of the United States Patent and Trademark Office*